Patented May 6, 1930

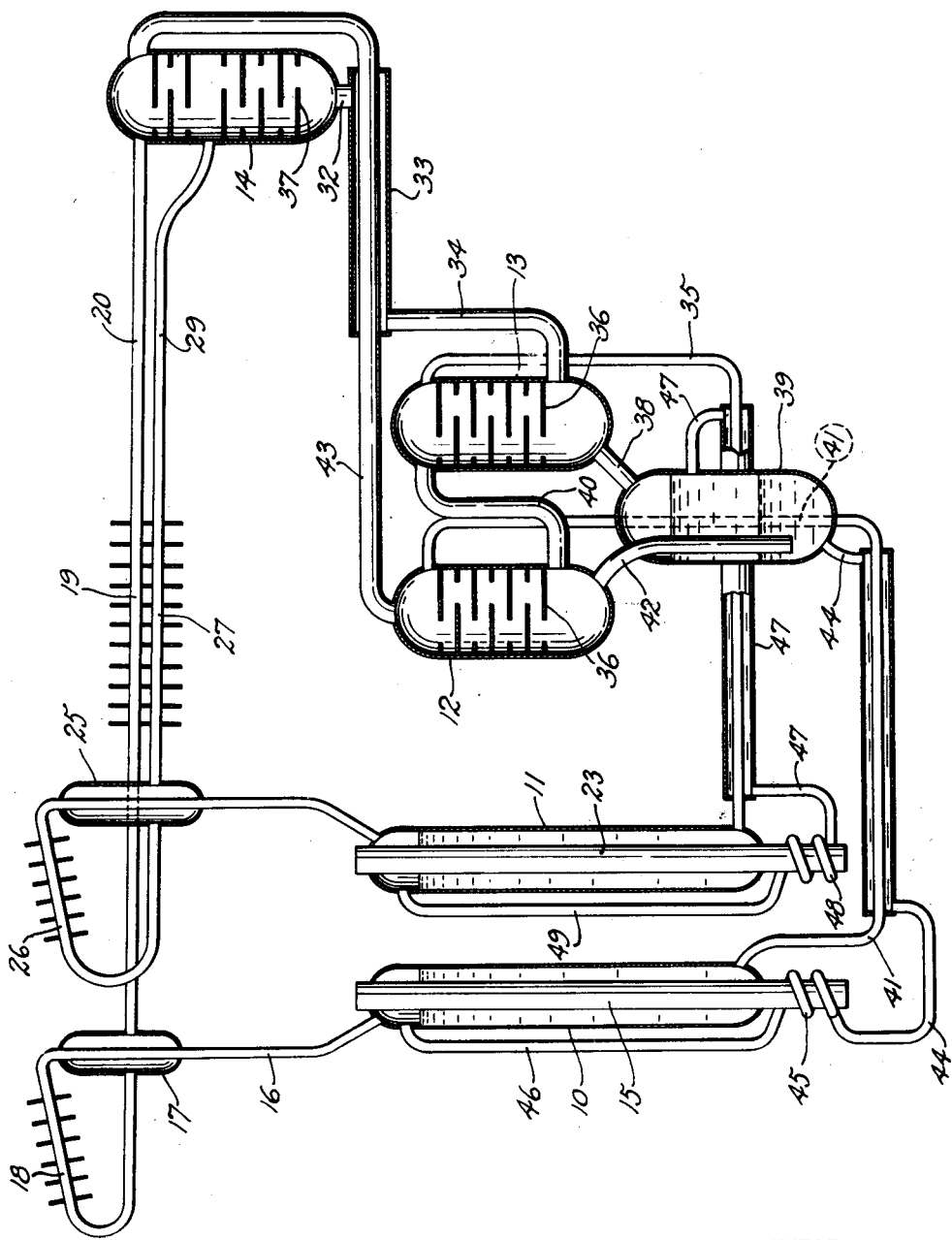

1,757,578

UNITED STATES PATENT OFFICE

ALVAR LENNING, OF NEW YORK, AND DONALD BRANCH KNIGHT, OF BROOKLYN, NEW YORK, ASSIGNORS TO ELECTROLUX SERVEL CORPORATION, OF NEW YORK, N. Y., A CORPORATION OF DELAWARE

REFRIGERATION

Application filed June 3, 1929. Serial No. 367,843.

Our invention relates to refrigeration and more particularly to refrigeration systems of the absorption type. Still more particularly, our invention relates to refrigerating apparatus of the type wherein an inert gas is used to equalize pressure.

One object of the invention is to provide an equalized pressure absorption refrigerating apparatus containing an inert gas wherein less inert gas need be circulated than with existing apparatus of this type for a given amount of refrigeration. This permits employing stronger solutions for a given evaporator temperature resulting in reduction of heat loss in generation and rectification.

Another object of the invention is to provide an improved system comprising a plurality of refrigerants and respective absorption liquids having high efficiency and simplicity of arrangement and construction.

A still further object of the invention is to provide an improved separation of different solutions in a refrigerating system.

Further objects and the nature and advantages of the invention will be apparent from consideration of the following description taken in conjunction with the accompanying drawing forming part of this specification:

The drawing shows, more or less diagrammatically, a refrigerating system comprising two generators, 10 and 11; two absorbers 12 and 13; and one evaporator 14. Generator 10 contains a solution of ammonia in water. The generator is heated by any suitable source of heat such as a gas flame projected into the flue 15. Ammonia is expelled from solution in generator 10 and passes through conduit 16 into rectifier 17. Rectifier member 17 comprises a jacket surrounding a portion of conduit 16. The ammonia is freed from water vapor in rectifier 17 and passes into condenser 18 where it is liquefied. The condensate runs into the jacket of rectifier 17 where it serves to cool the vapor in conduit 16. From the rectifier 17, the ammonia passes to a second condenser 19 and thence through conduit 20 into evaporator 14.

The second generator 11 contains a solution of butane in heptane. The generators are arranged at the same or substantially the same level. Generator 11 is heated in like manner to generator 10, having a flue 23. Butane vapor is driven out of solution and passes through conduit 24 and into rectifier 25. Thence butane vapor passes into condenser 26, where the butane is liquefied. Rectifier 25 serves the same purpose as rectifier 17; namely, to condense out vapor of absorption liquid and return the same to the generator; in this case heptane. Condensed butane passes from condenser 26 into the jacket of rectifier 25, where some is vaporized and the butane passes through a second condenser 27 and through conduit 29 into evaporator 14.

The evaporator is equipped with discs 37 having apertures in the same and on which pools of liquid refrigerant form. Both ammonia and butane are refrigerants in this case. The evaporator contains an inert gas; that is, inert with respect to ammonia and butane. This gas may be hydrogen. The butane, ammonia and hydrogen have complementary diffusion in the evaporator. The ammonia and butane evaporate into the hydrogen. This forms a gaseous mixture of ammonia vapor, butane vapor and hydrogen. This gaseous mixture flows through conduit 32 and into a gas heat exchanger 33. The gas mixture passes from the gas heat exchanger through conduit 34 and into absorber 13.

In absorber 13 the gas mixture is brought into the presence of absorption liquid carried from generator 11 through conduit 35. The absorption liquid cascades down in absorber 13 over perforated trays 36. The liquid which passes from generator 11 through conduit 35 into the upper part of absorber 13 is principally heptane capable of absorbing the butane but not the ammonia. This reforms the solution of butane in heptane. This solution passes from the bottom of absorber 13 through conduit 38 and into a vessel 39 which may be termed a flotation vessel.

The butane being removed from the gaseous mixture, the remaining constituents, ammonia vapor and hydrogen, pass through conduit 40 and into absorber 12 which is placed at the same or substantially the same level as absorber 13. Absorber 12 is also equipped with perforated trays 36. Absorption liquid, water weak in ammonia, passes through conduit 41 from generator 10 and into the upper part of absorber 12. This absorption liquid absorbs the ammonia in absorber 12. The reformed solution of ammonia in water passes through conduit 42 and also into flotation vessel 39. Conduit 40 may be placed in heat exchange with conduit 41 as shown in order to conserve heat. The hydrogen remaining after the successive absorption of the butane and the ammonia passes through conduit 43, through heat exchanger 33 and back into the upper part of the evaporator.

Circulation is produced between the absorbers and the evaporator due to the difference in specific gravity between the hydrogen in conduit 43 and absorber 12 on the one hand and the heavier gas mixture in the evaporator, conduit 32, the outer part of heat exchanger 33, conduit 34 and absorber 13 and conduit 40 on the other hand. Due to the difference in specific gravity, the heavier gas mixture flows downward in the evaporator and the light hydrogen flows upwardly through conduit 43.

Conduits 38 and 42 terminate at different levels in the flotation vessel 39. Conduit 38 is connected to the top of this vessel and conduit 42 is connected to a lower portion. The ammonia-water solution and the butane-hydrogen solution are not mutually soluble and float, one on the other, in vessel 39. They are separated by flotation. The ammonia-water solution is the heavier and settles to the bottom of vessel 39. For this reason conduit 42 is connected to the lower level in vessel 39. The ammonia-water solution passes through conduit 44, part of which is in heat exchange relation with conduit 41, thence through thermo-siphon element 45 and through conduit 46 into the upper part of generator 10. The thermo-siphon member is heated by the same source as generator 10 and serves to lift the solution to so high a level in generator 10 that liquid flows by gravity through conduit 41 into the upper part of absorber 12. The butane-heptane solution is drawn off from vessel 39 at a higher level through conduit 47, part of which is in heat exchange relation with conduit 35, passes through thermo-siphon element 48 and through conduit 49 into the upper part of generator 11. Thermo-siphon element 48 is heated and serves to lift the butane solution to so high a level in generator 11 that absorption liquid flows through conduit 35 from generator 11 into the upper part of absorber 13.

The system is hermetically sealed and has no moving parts. Circulation is produced by forces generated entirely within the system.

While we have described one embodiment of our invention, it will be understood that the invention may be carried out in different forms of apparatus.

What we claim is:

1. That improvement in the art of refrigerating through the agency of an absorption system which comprises simultaneously expelling a plurality of refrigerants from different absorption liquids, simultaneously condensing the refrigerants, evaporating the refrigerants in the presence of each other and in the presence of an inert gas, conducting the gaseous mixture thus formed into the presence of the different absorption liquids to dissolve the refrigerants into the respective absorption liquids and again expelling the refrigerants from the absorption liquids.

2. That improvement in the art of refrigerating through the agency of an absorption system which comprises simultaneously expelling a plurality of refrigerants from different absorption liquids, simultaneously and separately condensing the refrigerants, evaporating the refrigerants in the presence of each other and in the presence of an inert gas, conducting the gaseous mixture thus formed successively into the presence of the different absorption liquids and again expelling the refrigerants from the absorption liquids.

3. That improvement in the art of refrigerating through the agency of an absorption system which comprises simultaneously expelling a plurality of different refrigerants from solutions thereof in different absorption liquids, simultaneously and separately condensing the refrigerants, evaporating the refrigerants in the presence of each other and in the presence of an inert gas, conducting the gaseous mixture thus formed successively into the presence of the different absorption liquids, separating the solutions thus reformed by flotation and again expelling the refrigerants from solution.

4. That improvement in the art of refrigerating which consists in heating a solution of ammonia and water to expel ammonia therefrom, simultaneously heating a solution of butane in heptane to expel butane therefrom, separately condensing the ammonia and butane, introducing the condensed ammonia and condensed butane into the presence of each other and into the presence of a gas inert with respect to both butane and ammonia thus forming a gas mixture, conducting the gas mixture successively in contact with the respective absorption liquids to reform the solutions of ammonia in water and butane in heptane, returning the inert gas to the presence of the condensed butane and condensed ammonia, separating the reformed solutions and again expelling the ammonia from solution and the butane from solution.

5. That improvement in the art of refrigerating which consists in heating a solution of ammonia and water to expel ammonia therefrom, simultaneously heating a solution of butane in heptane to expel butane therefrom, separately condensing the ammonia and butane, introducing the condensed ammonia and condensed butane into the presence of each other and into the presence of a gas inert with respect to both butane and ammonia thus forming a gas mixture, conducting the gas mixture successively in contact with the respective absorption liquids to reform the solution of ammonia in water and butane in heptane, returning the inert gas to the presence of the condensed butane and condensed ammonia, separating the reformed solutions by flotation and again expelling the ammonia from solution and the butane from solution.

6. Refrigerating apparatus comprising a plurality of absorbers, a receiving vessel below the absorbers and conduits connecting the absorbers with different levels in the receiving vessel.

7. Refrigerating apparatus comprising a plurality of generators, a plurality of condensers, a plurality of absorbers and a single evaporator, the aforementioned parts being interconnected to form a plurality of refrigerant cycles, each comprising a separate generator, a separate condenser, a separate absorber and the single evaporator.

8. Refrigerating apparatus comprising an evaporator, a plurality of absorbers, means to separately withdraw absorption liquids from the absorbers, heat the liquids to produce vapors, condense the vapors and separately introduce the condensed vapors into the evaporator and means to conduct fluid from the evaporator to the absorbers.

9. Refrigerating apparatus comprising an evaporator, a plurality of absorbers, means to separately withdraw absorption liquids from the absorbers, heat the liquids to produce vapors, condense the vapors and separately introduce the condensed vapors into the evaporator and means to circulate an inert gas between and through the evaporator and absorbers.

10. Refrigerating apparatus comprising an evaporator, a plurality of absorbers, means to separately withdraw absorption liquids from the absorbers, heat the liquids to produce vapors, condense the vapors and separately introduce the condensed vapors into the evaporator, said means comprising a receiving vessel below the absorbers and conduits connecting the absorbers with different levels in the receiving vessel and means to conduct fluid from the evaporator to the absorbers.

11. Refrigerating apparatus comprising an evaporator, a plurality of absorbers, means to separately withdraw absorption liquids from the absorbers, heat the liquids to produce vapors, condense the vapors and separately introduce the condensed vapors into the evaporator, said means comprising a receiving vessel below the absorbers and conduits connecting the absorbers with different levels in the receiving vessel and means to circulate an inert gas between and through the evaporator and absorbers.

In testimony whereof we have affixed our signatures.

ALVAR LENNING.
DONALD BRANCH KNIGHT.